Nov. 14, 1972   L. O. HEFLINGER   3,702,738
HOLOGRAPHIC INTERFEROMETRIC SYSTEM FOR GENERATING FINITE FRINGES
Filed June 23, 1971
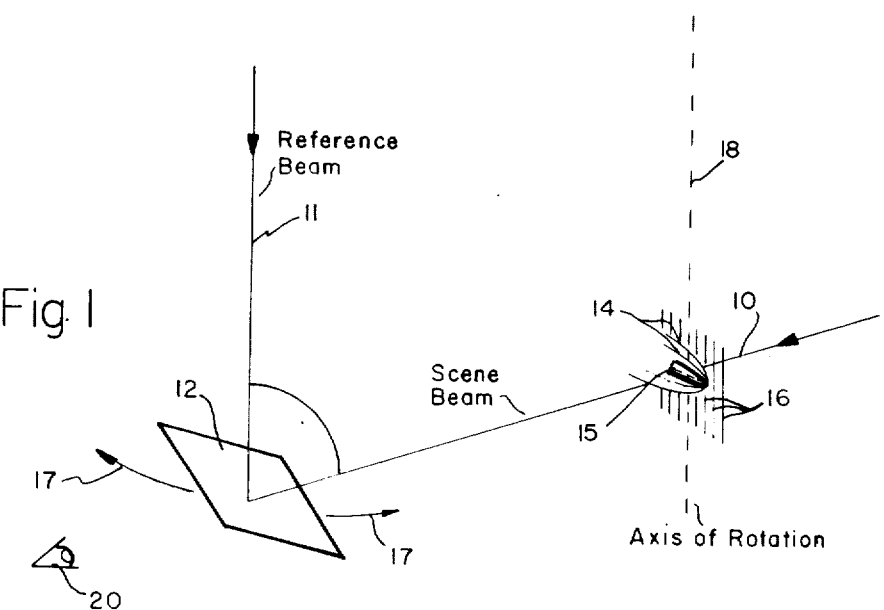
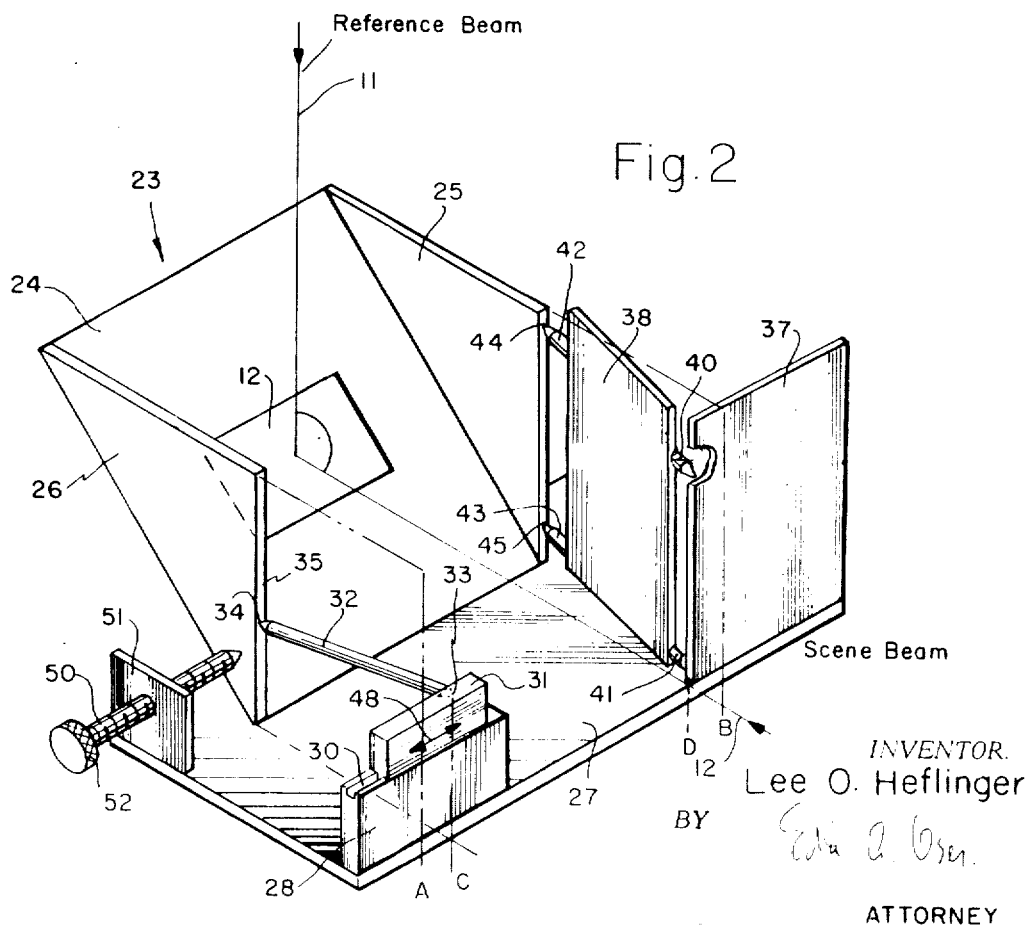
INVENTOR.
Lee O. Heflinger
BY
ATTORNEY

United States Patent Office 3,702,738
Patented Nov. 14, 1972

3,702,738
HOLOGRAPHIC INTERFEROMETRIC SYSTEM FOR
GENERATING FINITE FRINGES
Lee Opert Teflinger, Torrance, Calif., assignor to
TRW Inc., Redondo Beach, Calif.
Filed June 23, 1971, Ser. No. 155,695
Int. Cl. G01b 9/02
U.S. Cl. 356—109    6 Claims

ABSTRACT OF THE DISCLOSURE

A double exposure holographic system including means for generating finite fringes at the plane of an object. The holographic system is generally conventional and a double exposure is taken first of the object to be recorded and then of the displaced or perturbed object. Between exposures the recording medium on which the hologram is to be recorded is rotated through an axis which passes approximately through the object. The angle between subject and reference beams may be large, that is, between approximately 60° and 90°. Generally, the axis through which the recording material is rotated is approximately parallel to the reference beam or else it may be orthogonal to both reference and subject beams. The fringes are parallel to the axis of rotation, and can be made to focus in the plane of the object permitting high resolution readout.

The invention herein described was made in the course of or under a contract or subcontract thereunder with the Department of the Army.

CROSS REFERENCE TO RELATED APPLICATION

The present application is related to a prior co-pending application of the present applicant entitled "Fringe Generating Holographic System," Ser. No. 840,908 filed on July 11, 1969, and assigned to the assignee of the present application now U.S. Pat. 3,614,234. The prior co-pending application discloses also a double exposure holographic system which permits to produce finite fringes at the plane of an object. However, in accordance with the prior application, this is achieved by rotating a light diffuser inserted in the path of the scene beam through a predetermined point outside of the plane of the light diffuser. Furthermore, the spacing between adjacent fringes may be controlled by the angle through which the diffuser is rotated.

BACKGROUND OF THE INVENTION

The present invention relates generally to holography and particularly relates to a double exposure holographic system which permits to generate finite fringes in the plane of the object.

As pointed out in the prior co-pending application previously referred to, it is conventional practice to produce finite interference fringes in the plane of an object in accordance with conventional optical interferometric methods. Therefore, it is equally desirable to produce such finite fringes when the interferometric work is done, for example, by double exposure holography.

This permits to measure with precision distances between fringes of the image. For example, it is possible to measure variations of the density of a gas due, for example, to shock waves generated in the gas. The fringes also make it possible to determine the sense of direction of variations such as those of the index of refraction of an object. Thus, by looking at the fringes generated in the plane of the object it is possible to see these variations with the eye as hills and valleys so that it is possible to determine whether, for example, the gas density increases or decreases or whether the index of refraction decreases or increases.

Thus, the holographic interferometric method and apparatus of the invention are particularly useful in aerodynamics, chemistry, or for the investigation of shock waves such as are caused by flying bullets, rocket exhausts and the like.

As explained hereinabove, the prior co-pending application permits to produce such finite fringes by interposing a diffuser in the path of the subject beam and rotating the diffuser. However, it has been discovered that this is not always convenient for reasons of mechanics and geometry.

For example, the incorporation of the rotating diffuser concept in existing holocameras may be inconvenient because the light must impinge upon the diffuser at particular angles not commonly encountered in conventional holocameras.

It is accordingly an object of the present invention to provide a double exposure holographic system for interferometric work which permits to locate finite fringes within the plane of the object without the necessity of a rotatable diffuser in the path of the subject beam.

A further object of the present invention is to provide a holographic interferometric system of the type referred to which permits aerodynamic measurements such as the density of gases and the like without requiring any additional equipment except means for rotating the recording medium between exposures.

Another object of the present invention is to provide a double exposure holographic system for interferometric work which permits the generation of finite fringes directly on the object without the necessity of placing any mechanical means at the location of the object or in its neighborhood.

SUMMARY OF THE INVENTION

In accordance with the present invention, there is provided a generally conventional holographic system suitable for taking double exposure holograms. Thus, there is provided both a scene beam and a reference beam both of which are projected on the recording material. The recording material is disposed in a predetermined plane. The two beams, that is the scene beam and the reference beam, are substantially monochromatic and further they are coherent with respect to each other. Specifically, there is provided means for rotating the recording material about a predetermined axis which extends approximately through the object to be recorded. Accordingly, the recording material is rotated between the two exposures whereby finite fringes appear on the object. These fringes are substantially parallel to the axis of rotation.

Preferably, the reference and scene beam intersect each other at the recording material at an angle of approximately 60° to 90°. If the angle is 90° the axis of rotation may be parallel to the reference beam or else the axis of rotation may be orthogonal to both the scene beam and the reference beam.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWING

FIG. 1 is a schematic representation of a holographic system for obtaining a double exposure hologram which creates fringes in the plane of the object; and FIG. 2 is a view in perspective of an exemplary apparatus for rotating the recording material about a predetermined axis between exposures and which permits to control the amount of rotation of the recording material as well as the location of the axis of rotation of the recording material.

DESCRIPTION OF THE PREFERRED EMBODIMENT

Referring now to the drawing and particularly to FIG. 1, there is illustrated somewhat schematically a double exposure holographic system embodying the present invention. The system includes a scene beam 10 and a reference beam 11. Both scene and reference beams 10 and 11 are substantially monochromatic and coherent with respect to each other. Preferably, they are generated by a laser and split into two beams, for example, by a conventional beam splitter (not shown). Both the scene beam 10 and the reference beam 11 meet at the photosensitive recording medium 12. This may consist, for example, of a suitable photographic film or plate, or of a photochromic material. Preferably, although not necessarily, the scene beam 10 and reference beam 11 intersect each other at the plane of the recording material 12 at an angle of approximately 90°.

The holographic system of the present invention is a double exposure system. Therefore, two separate exposures or recordings are made on the recording material 12. The first recording is made either without an object or with the undistorted object. The second exposure is made with the object or with a distorted or slightly displaced object. For example it may be assumed as shown in FIG. 1 that the shock wave 14 of a bullet 15 is to be recorded. In this case the air may be considered the object. Thus, for the first exposure the air is undisturbed. Due to the passage of the bullet the air becomes disturbed and a shock wave 14 is created. Due to differences in the index of refraction of the air, or due to a change in density, the optical rays between the first and the second exposure may have a different optical path length and accordingly the two rays interfere with each other to create dark and light portions depending upon whether the phases of the two waves cancel or reinforce each other.

In accordance with the present invention it is now desired to generate a system of fringes such as shown at 16 which are superimposed on the object, that is which are at a finite distance and located in the plane of the object.

As explained in the co-pending application previously referred to, this may be effected by interposing a diffuser in the path of the scene beam and by rotating the light diffuser in such a way that such fringes appear. It has also been explained herein that in some cases such, for example, as a ballistic range, it may not be possible for geometric reasons to provide such a rotatable light diffuser.

Accordingly, it has been discovered in accordance with the present invention that such finite fringes 16 may be generated by simply rotating the recording material 12 between exposures as shown by the arrow 17 about the axis of rotation 18.

Assuming that the angle between reference beam 11 and scene beam 10 where they intersect in the plane of the recording material 12 is 90°, the axis of rotation 18 may be disposed parallel to the reference beam 11 as shown. In that case the fringes 16 are parallel to the axis of rotation and to the reference beam 11.

It has been found, however, that the angle between scene beam 10 and reference beam 11 may be varied between approximately 60° and approximately 90°. In that case the location of the axis of rotation 18 should also be varied accordingly. In that case, for example, the axis of rotation 18 may not pass exactly through the object but generally will be located in the neighborhood thereof. It may also be necessary to tilt the axis of rotation 18 with respect to the scene beam 10 in case the angle between the beams 10 and 11 is not 90°.

It should also be pointed out that the scene beam 10, the reference beam 11 and the axis of rotation 18 may be orthogonal with respect to each other. However, in any case the fringes 16 are disposed parallel to the axis of rotation 18. While FIG. 1 does not illustrate a diffuser, a diffuser may be incorporated into the path of the subject beam 10. For some applications the use of a diffuser in the scene beam is preferred.

Furthermore, the fringes may appear tipped if the axis of rotation is tilted with respect to the subject beam 10.

Thus, after the first exposure is made on the recording material 12 the recording material is rotated as shown by the arrows 17 about the selected axis 18 and then another exposure is made. The amount of movement of the recording material 12 and the wavelength of the light among others, determine the spacing of the fringes.

It should be noted that the exact position of the axis of rotation 18 may have to be determined experimentally. Thus, a few exposures may have to be made until the exact position for the axis of rotation is determined.

The developed hologram 12 may be viewed by an observer as indicated at 20 whereby the fringes 16 appear superimposed on the object when the recording is illuminated by the reference beam 11. It has been found that the fringes permit viewing of the hologram so that hills and valleys appear indicating an increase or decrease in the index of refraction or the like. However, it is not necessary to view the hologram in the same apparatus used to expose the hologram.

It will be realized that there are many ways in which the recording material 12 may be rotated and the location of the axis of rotation 18 determined. However, by way of example, FIG. 2 illustrates a relatively simple apparatus which will accomplish this end. The recording material 12 is disposed in a hologram holder generally indicated at 23 and having a hologram plate 24 on which the recording material 12 is secured and two side plates 25 and 26 rigidly connected to the hologram plate 24. The hologram holder 23 is mounted on a base plate 27 which represents the fixed portion of the apparatus.

A stationary vertical plate 28 is mounted on the base plate 27 and is provided with a groove 30 at its top to permit sliding movement of a radius adjusting block 31. A rod 32 is pivotally mounted at 33 to the surface of the radius adjustment block 31 facing the hologram holder 23. The other end of the rod 32 is pivoted at 34 to the front surface 35 of the side plate 26.

Another vertical support plate 37 is secured to the base plate 27. A tilting plate 38 is pivoted to the stationary vertical support plate 37 by a pair of pivoted rods 40 and 41 each of which is pivoted to the vertical plate 37. Similarly, the tilting plate 38 is pivoted by a pair of pivots or rods 42 and 43 to the front surface of the hologram holder side plate 25.

It will now be seen that the hologram holder 23 is capable of tilting about a plane defined by 3 points viz, the pivot 33 of the rod 32 and by the pivots of the respective pivot rods 40 and 41. This plane is capable of rotating or tilting about a second plane defined by a second set of 3 points, viz, the pivot 33 and the pivot points of rods 41 and 40 on support plate 37. This will permit rotation of the hologram holder 23 about an imaginary axis. The position of the axis is defined as follows: C is the projection of pivot point 33 to the base plate 27. Similarly, D is the projection of the pivot points of rods 40 and 41. A indicates a projection as indicated in the drawing of pivot point 34 on the base plate 27 and similarly B is a projection of the pivot points 44 and 45 on base plate 27. It will now be seen that if the distance CD equals the distance AB, the radius about which the recording material 12 rotates is infinity. On the other hand, if the distance CD becomes 0 then the radius about which the recording material 12 rotates equals the distance from the hologram 12 to the stationary pivots 33, 40 and 41.

These distances may be adjusted by movement of the radius adjustment block 31 as shown by the double-headed arrow 48.

The actual rotation of the hologram holder 23 may be effected by a fine adjustment screw 50 extending through a vertical plate 51 fixed to the base plate 27 and bearing against the side surface of the side plate 26 of the hologram holder 23. Thus, rotation of the fine adjustment screw 50 by its knurled head 52 will push the entire hologram holder 23 towards the right and about its respective pivot points.

As indicated before the adjustment of the recording material between exposures may be achieved in any other conventional way. However, the apparatus of FIG. 2 does permit to adjust the radius, that is the location of the axis of rotation 18 as well as the angle through which the recording material is rotated.

A double exposure holographic system as described has the usual advantages. Thus, since two exposures are made, one with and one without the object, or rather one with an unperturbed and one with a perturbed object, all optical imperfections are eliminated. Only those introduced by changes of the object show on the hologram. This, of course, means that it is possible to utilize relatively inexpensive optical components such as reflectors and lenses. These components do not have to be optically perfect because any imperfections are compensated for by the double exposure.

It should also be noted that the scene and reference beams 10 and 11 may be diverging beams or collimated beams as the occasion requires.

There has thus been disclosed a double exposure holographic system which makes it possible to record not only the hologram of an object but a set of interference fringes appearing in a predetermined plane which is preferably located in the plane of the object. This may be effected by rotating the recording material between the two exposures. The geometry of the arrangement determines the location of the plane of the fringes. The amount of rotation and the wave length of the light among others determines the distance between adjacent fringes. This holographic system and method is particularly useful for investigating shock waves such as caused by flying bullets, rocket exhaust and the like. One of its advantages is that it does not require the interposition of any physical object in the neighborhood of the object. It is particularly useful for holograms of objects in transmission.

What is claimed is:

1. A double exposure holographic system for producing fringes substantially at the plane of an object when viewing a hologram of the object and the fringes, said system comprising:
   (a) a photosensitive recording material disposed in a predetermined plane;
   (b) means for generating a scene beam and a reference beam and projecting them on said recording material, said beams being substantially monochromatic and coherent with respect to each other; and
   (c) means for rotating said recording material about a predetermined axis extending approximately through the object to be recorded and substantially parallel to said reference beam, whereby finite fringes appear on the object substantially parallel to said axis when a double exposure is made with said recording material in two discrete positions rotated with respect to said axis.

2. A holographic system as defined in claim 1 wherein said reference beam and said subject beam intersect each other in said predetermined plane at an angle between approximately 60° and approximately 90°.

3. A holographic system as defined in claim 1 wherein said reference beam and said scene beam intersect each other at said predetermined plane at an angle of approximately 90° and wherein said recording material is rotated about an axis extending through the object.

4. A method of recording a hologram of an object by double exposure in such a manner that finite fringes appear substantially on the object, said method comprising the steps of:
   (a) generating a substantially monochromatic reference beam and scene beam, said beams being coherent with respect to each other and directing the reference and the scene beams onto a recording material disposed in a predetermined plane for recording a hologram; and
   (b) rotating the recording material about an axis passing approximately through the object and extending substantially parallel to said reference beam between two successive exposures of the unperturbed and perturbed object in such a manner that finite fringes appear on the object when the exposed hologram is viewed, the fringes being substantially parallel to the axis.

5. A method as defined in claim 4 wherein the reference beam and the scene beam intersect each other at the plane of the recording material at an angle of between approximately 60° and approximately 90°.

6. A method as defined in claim 4 wherein the reference beam forms an angle of approximately 90° with the scene beam at the plane of the recording material and wherein the recording material is rotated through an axis passing through the object to be recorded.

References Cited
UNITED STATES PATENTS 3,612,693   10/1971   Stetson _____ 350—3.5

DAVID SCHONBERG, Primary Examiner

R. J. STERN, Assistant Examiner

U.S. Cl. X.R.

350—3.5